United States Patent [19]

Godbersen

[11] Patent Number: 4,875,701

[45] Date of Patent: Oct. 24, 1989

[54] BOAT TRAILER HULL AND KEEL SUPPORTING ASSEMBLY

[76] Inventor: Byron L. Godbersen, Lake LaJune Estates, Ida Grove, Iowa 51445

[21] Appl. No.: 287,170

[22] Filed: Dec. 21, 1988

[51] Int. Cl.$^4$ .............................................. B60P 3/10
[52] U.S. Cl. .................................. 280/414.1; 414/534
[58] Field of Search ..................................... 280/414.1; 414/529–536

[56] References Cited

U.S. PATENT DOCUMENTS

| | | |
|---|---|---|
| 2,691,534 | 10/1954 | Sampsell . |
| 2,937,775 | 5/1960 | Funk, Jr. . |
| 3,044,646 | 7/1962 | Sperow . |
| 3,104,770 | 9/1963 | Calkins et al. ..................... 414/534 |
| 3,203,563 | 8/1965 | Blatchford . |
| 3,539,066 | 11/1970 | Stevenson . |
| 3,774,790 | 11/1973 | Godbersen . |
| 3,917,087 | 11/1975 | Godbersen . |

OTHER PUBLICATIONS

Copy of page 1320 from *Official Gazette* dated Jul. 21, 1987 Showing Patent No. 4,681,334 to William D. O'Brien, Jr.

*Primary Examiner*—Charles A. Marmor
*Assistant Examiner*—Donn McGiehan
*Attorney, Agent, or Firm*—Henderson & Sturm

[57] ABSTRACT

A boat trailer having a frame, a wheel unit supporting the frame, a rear cross member between elements of the frame for supporting a plurality of roller units, and a front cross member between other elements of the frame for supporting a hull supporting unit comprised of an elongated, resilient pad secured to the upper surface of the cross member, and with a plastic or like cover for the pad; and the front cross member having also mounted thereon a keel supporting unit with openings formed in an upper plastic-like element engageable with the front portion of the keel of a boat being transported by the trailer wherein foreign material such as sand and gravel on the keel front portion is removed by said keel supporting unit by passage through the openings, and thereby preventing scouring and scratching of the keel front portion.

5 Claims, 3 Drawing Sheets

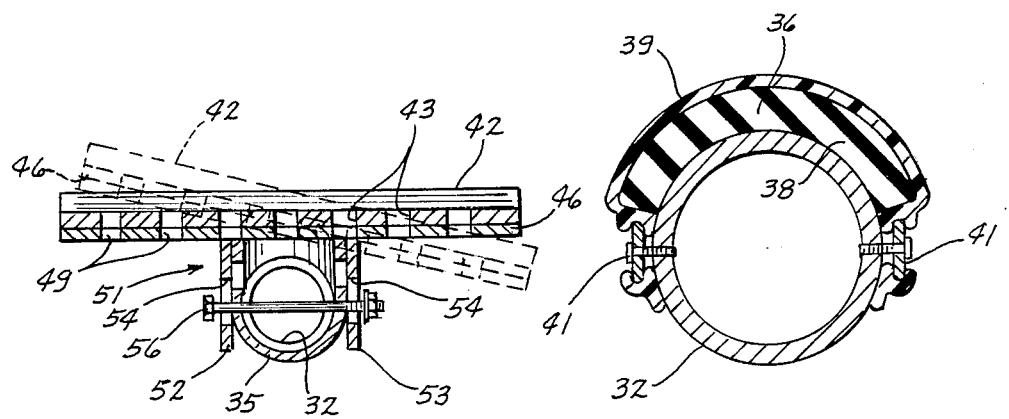

BOAT TRAILER HULL AND KEEL SUPPORTING ASSEMBLY

TECHNICAL FIELD

The present invention relates generally to boat carrying trailers, and more particularly to those of the type in which a longitudinal frame having a tongue and hitch for attachment to a prime mover is equipped with support units engaging the keel and the bottom o the boat hull adjacent the bow and stern, respectively, the frame having a pair of ground wheels adjacent the rear of the frame. To load and unload the boat to and from the trailer, the trailer is moved into the water a sufficient distance to enable the boat to float on and off the trailer, as controlled by a winch assembly adjacent the hitch.

BACKGROUND ART

With an ever increasing number of different sized and shaped boats, the contemporary trailers have tended to develop an ever increasing arrangement of bow, keel and stern supports for accommodating the great variety of trailers. Proper distribution of the weight of the trailer on the frame such that pressure on the tongue will accommodate a balanced connection to the prime mover has been attempted by having one or more stationary hull and keel support units mounted forwardly on the frame, and either bunks or gangs of horizontally and vertically adjustable rollers mounted rearwardly on the frame. Examples of various such arrangements are shown in U.S. Pat Nos. 2,816,672; 2,948,423; 3,774,790 and 3,917,087.

Nevertheless, the trailer industry has not only not solved the constant problem of ease of adjustment for proper tongue weight distribution, but has exacerbated the problem by proliferation of the types and arrangement of gangs of rollers such that the problem has actually worsened. Further, there have been no improvements of consequence to the structures for supporting the boat hull and keel, other than that mentioned immediately hereinafter.

In my pending application, Ser. No. 07/112,476 filed Oct. 26, 1987, I revealed an improved boat hull and keel supporting assembly for use with a boat trailer. Although a decided improvement over the prior art, one disadvantage has been found that there is a tendency to cause some scouring and/or scratching of the keel by the keel supporting portion of that assembly due to the presence of sand, gravel and the like on the keel of the boat as the boat is being moved to relative to the trailer and during transportation thereon.

It is to the elimination of this problem of potential keel scuffing and scratching that this invention is directed.

DISCLOSURE OF THE INVENTION

In a trailer for transporting a boat or the like, the trailer having a longitudinal frame of wishbone shape, the forward tongue end having a hitch for connection to a prime mover, having a stand-mounted winch assembly for cable control of the boat, a wheel and axle unit mounted rearwardly of the frame, a hull and keel supporting assembly secured to the frame forwardly of the wheels, and a hull supporting assembly comprising a cross member with a pair of in-line roller units mounted thereon in laterally-spaced, parallel, longitudinally extended arrangement; the invention comprises the hull and keel supporting assembly including a keel supporting unit having a plurality of longitudinally spaced and aligned slots formed therein, whereby foreign material such as sand and gravel is removed from the boat keel upon engagement by the said keel supporting unit, and which foreign material then falls through the said slots.

The invention comprises further the hull supporting assembly including a semi-circular pad of resilient material mounted on the upper surface of the cross member, and a semi-circular device embracing the pad and securing the pad to the cross member, both the pad and the device extended longitudinally between the keel supporting unit and each side of the frame.

It is an object of this invention to provide a new and novel trailer of the type described herein.

It is another object of this invention to provide an improved boat trailer of the float-on type, wherein the forward keel support not only has pivotal and longitudinal support for the keel, but also obviates any scratching or scuffing of the keel due to engagement therewith by the keel support of the trailer.

Still another object of this invention is to provide an improved boat hull supporting assembly adjacent the keel supporting unit wherein an improved nesting-type support of the boat hull is provided.

BRIEF DESCRIPTION OF THE DRAWINGS

These and other attributes of the invention will become more clear upon a thorough study of the following description of the best mode for carrying out the invention, particularly when reviewed in conjunction with the accompanying drawings, wherein:

FIG. 8 is a sectional view taken along the line 8—8 in FIG. 7; and

FIG. 9 is an enlarged sectional view taken along the line 9—9 in FIG. 7.

BEST MODE FOR CARRYING OUT THE INVENTION

Figure 1:
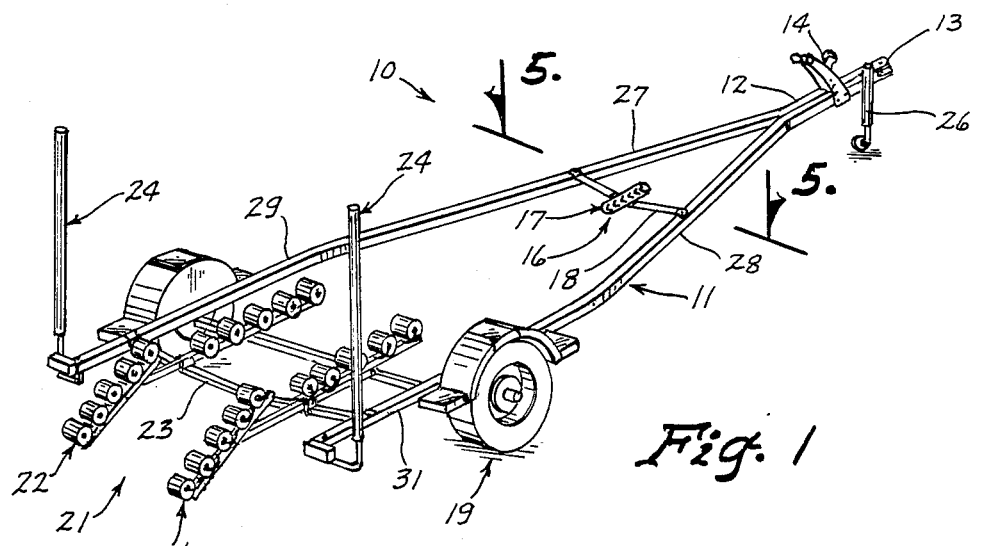
FIG. 1 is a perspective view of the boat trailer of the present invention.
Figure 2:
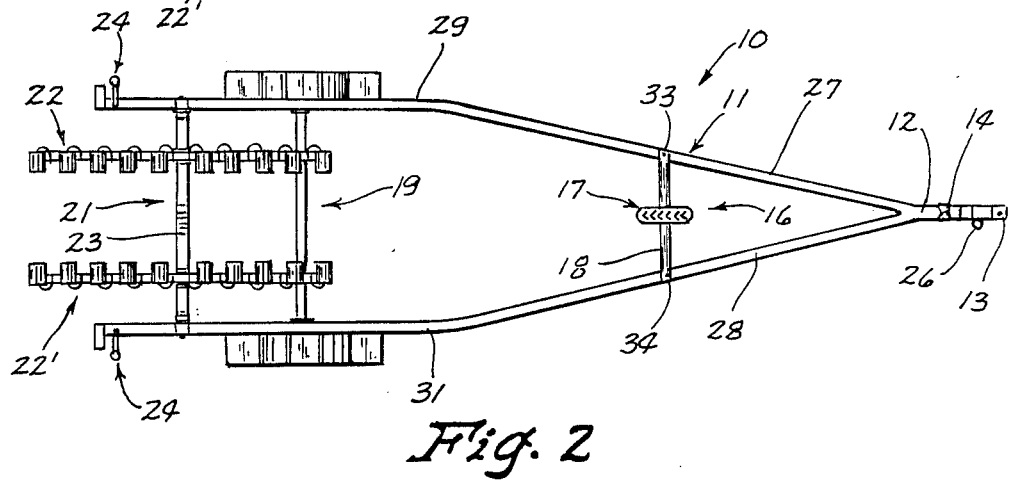
FIG. 2 is a top plan view thereof.
Figure 3:
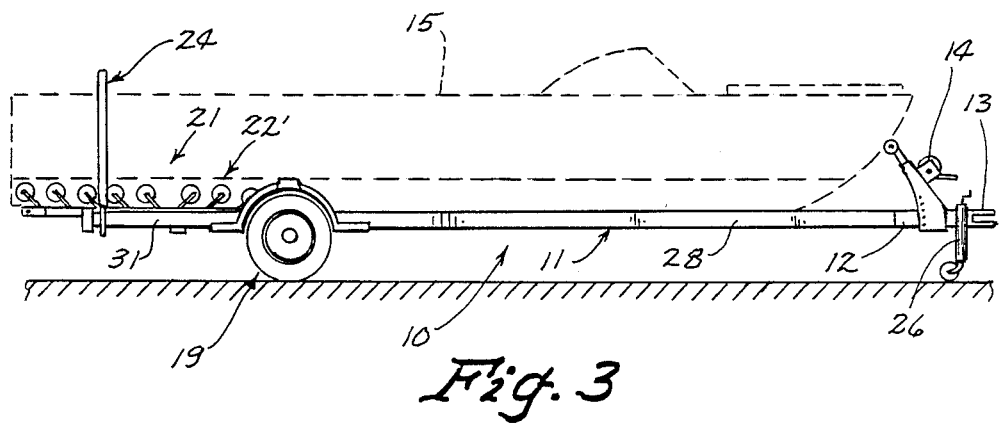
FIG. 3 is side elevational view thereof, a boat being carried by the trailer being shown by dotted lines.

Referring now to the drawings, the boat trailer of this invention is illustrated generally at (10) in FIGS. 1-3 and comprises a frame assembly (11) including a tongue (12) and hitch (13) for conventional attachment to a prime mover (not shown); a winch and stand assembly (14) mounted on the tongue (12) for mounting and demounting connection to the boat (15) (FIG. 3) to be transported thereby; a hull and keel supporting assembly (16) which includes a pivotal keel supporting unit (17) and a front hull supporting unit (18); a wheel and axle unit (19) for rollably supporting the rear of the frame assembly (11); a rear hull supporting unit (21) including a pair of in-line roller units (22) and (22') mounted on a cross member (23); and a post load guide unit (24). A conventional jack unit (26) is provided the front of the tongue (12) for supporting the trailer (10) in a horizontal position while not connected to a prime mover.

The frame assembly (11) includes a pair of diverging side members (27, 28) with integral, parallel rear members (29, 31), the latter mounted on the wheel and axle unit (19). The diverging side members (27, 28) are interconnected by the front hull supporting unit (18) of the hull and keel supporting assembly (16).

Figure 4:
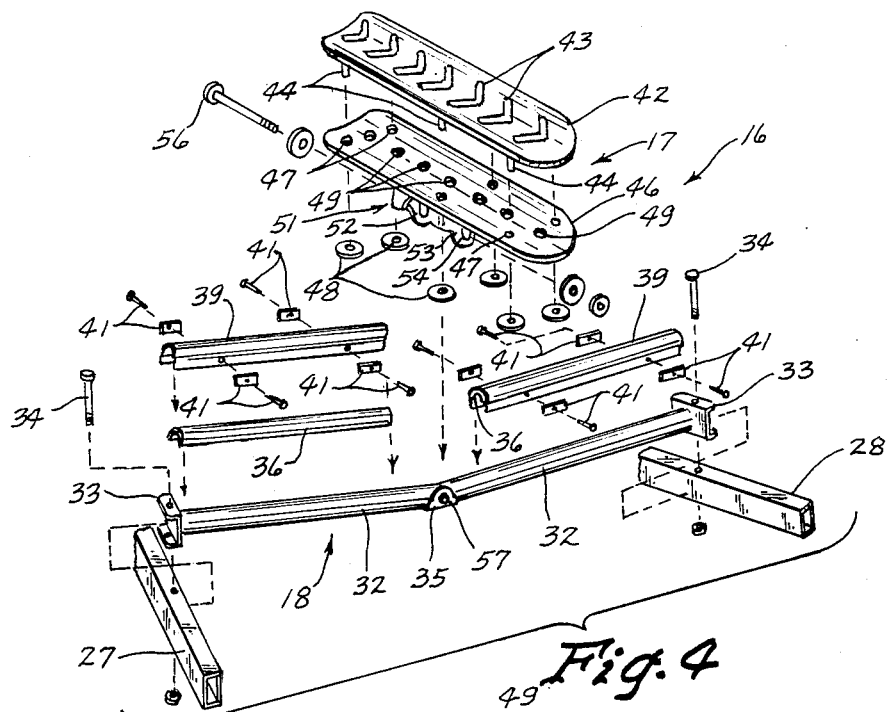
FIG. 4 is a perspective, exploded view of the boat hull and keel supporting assembly of this invention.

More particularly, the front hull supporting unit (18) comprises a front cross member (32) of a slight V-shape in side elevation attached by outer brackets (33) secured to the outer ends thereof to the frame side members (27, 28) (FIG. 4). Although the cross member (32) may be integral, it may also be of two portions which are interconnected at their inner mating ends by a conventional fastening device (35) (FIGS. 4 and 8). A pair of elongated semi-circular pads (36) of resilient material are mounted on the upper surface (38) of the cross member (32), being disposed between the center of the cross member (32) and the brackets (33); and which pads (36) are embraced by another like pair of elongated semi-circular covers (39) of a plastic material or the like, the covers (39) securing the pads (36) to the cross member (32) by a plurality of fastening brackets (41) best shown in FIG. 9.

By the provision of the front hull supporting unit (18), as the boat (15) is loaded onto the trailer (10) and is supported during transportation, the hull (not shown) of the boat (15) at the location of the front hull supporting unit (18) is readily received in a nested, resilient condition for improved loading and transportation of the boat (15) by the trailer (10).

Figure 5:
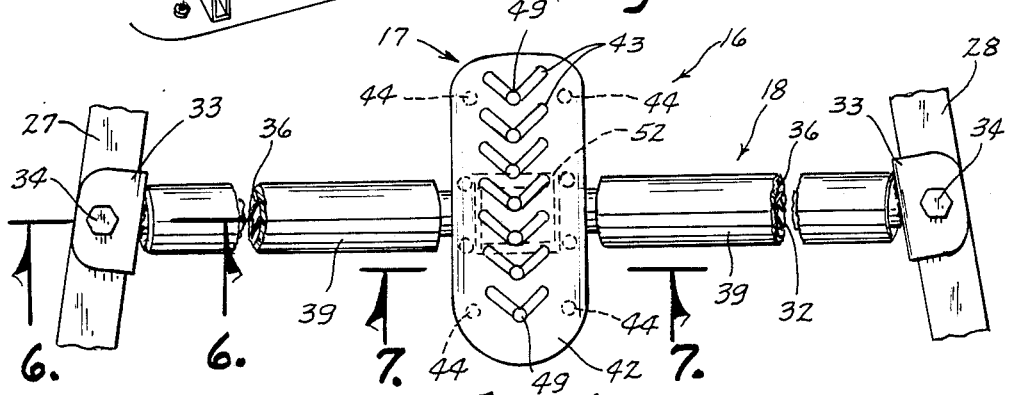
FIG. 5 is an enlarged plan view of the boat hull and keel supporting assembly of this invention.
Figure 6:
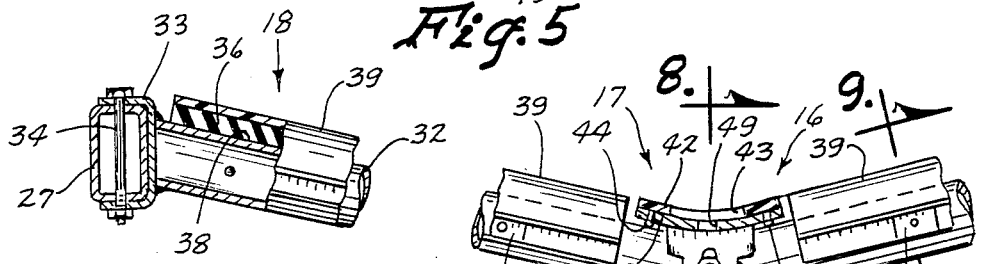
FIG. 6 is a sectional view taken along the line 6—6 in FIG. 5.

The keel supporting unit (17) comprises an upper skid element (42) formed of a plastic material, which skid element has a slightly curved form in cross section (FIG. 7) to receive the boat keel in a nested condition, and which skid element (42) has a plurality of V-shaped slots (43) (FIG. 5) formed therein in a herringbone manner, the slots (43) being longitudinally spaced of the frame assembly (11) and aligned with the longitudinal direction of the boat keel. The skid element (42) is provided further with the plurality of depending pegs (44) (FIG. 4) for the purpose hereinafter described.

Figure 7:
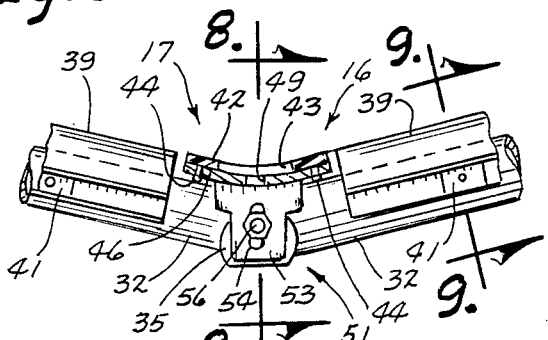
FIG. 7 is a sectional view taken along the line 7—7 in FIG. 5.

The keel supporting unit (17) comprises further a supporting element (46) of substantially the same size and formation as the skid element (42) (see FIG. 4). The supporting element (46) has a plurality of holes (47) to receive the pegs (44) of the skid element (42), and by means of fastening devices (48) (FIG. 4) the elements (42) and (46) are secured together as best shown in FIG. 7. Longitudinally aligned and spaced passages (49) (FIGS. 4 and 5) are formed in the supporting element (46), and which passages (49) are vertically aligned with the slots (43) of the skid element such that any foreign material on the keel of the boat engaged by the skid element (42) is removed therefrom due to the provision of the slots (43) and the passages (49) of the elements (42) and (46), respectively. The foreign material removed from the boat keel will fall through both the slots (43) and the passages (49) aligned therewith as the trailer transports the boat. Thus, scouring or scratching of the boat keel engaged with or moved over the unit (17) is obviated.

The supporting element (46) also is provided with a depending mounting bracket (51) (FIGS. 4 and 7) integral therewith, which bracket includes a pair of longitudinally spaced depending legs (52) and (53) each leg of which has an elongated hole therein. By this arrangement, a fastening bolt (56) passed through the holes (54) and an opening (57, FIG. 4) formed in the device (35) enables the keel supporting unit (17) not only to pivot about a transverse axis in a vertical plane longitudinally of the trailer (10), but also to pivot about a longitudinal axis transversely of the trailer (10) in order to receive and nest the boat keel in the most expeditious manner.

Accordingly, it can be seen that the illustrated embodiment of the present invention accomplishes all of the objectives referred to hereinbefore. Obviously, many modifications and variations of the present invention are possible in light of the above teachings. It is therefore to be understood that, within the scope of the appended claims, the invention may be practiced otherwise than as specifically described.

I claim:

1. Boat hull and keel supporting assembly for use with a boat trailer having a frame including a pair of frame members extended rearwardly from a tongue connection, said supporting means comprising:

a cross member secured to and extended transversely between the frame members;

hull supporting means mounted on said cross member and extended transversely therebetween;

keel supporting means pivotally mounted on said cross member and extended normal thereto for movement about a transverse axis, said keel supporting means having openings formed therein for removing foreign material from the boat keel engaged thereby;

and further wherein said keel supporting means includes at least one element engageable with the boat keel and having a plurality of longitudinally spaced and aligned slots formed therein, whereby foreign material is removed from the boat keel upon engagement by the said one element, which foreign material falls through the said slots.

2. A boat hull and keel supporting assembly as defined in claim 1 and further wherein said keel supporting means includes a second element secured to and disposed below said one element, said second element having one or more openings formed therein aligned with one or more said slots for the passage therethrough of foreign material, and wherein said one element is of a plastic material.

3. A boat hull and keel supporting assembly as defined in claim 2 and wherein said one and second elements are cup-shaped in transverse cross sectional for receiving the keel in a nested condition, and further wherein said slots are identical and of a herringbone pattern.

4. A boat hull and keel supporting assembly as defined in claim 1 and wherein said hull supporting means comprises an elongated, semi-circular pad of resilient material mounted on the upper surface of said cross member, and an elongated semi-circular cover embracing said pad and securing said pad to said cross member.

5. A boat hull and keel supporting assembly as defined in claim 4 and wherein said pad and said cover extend longitudinally of said cross member between said keel supporting means and each of said frame members.

* * * * *